Patented Sept. 4, 1934

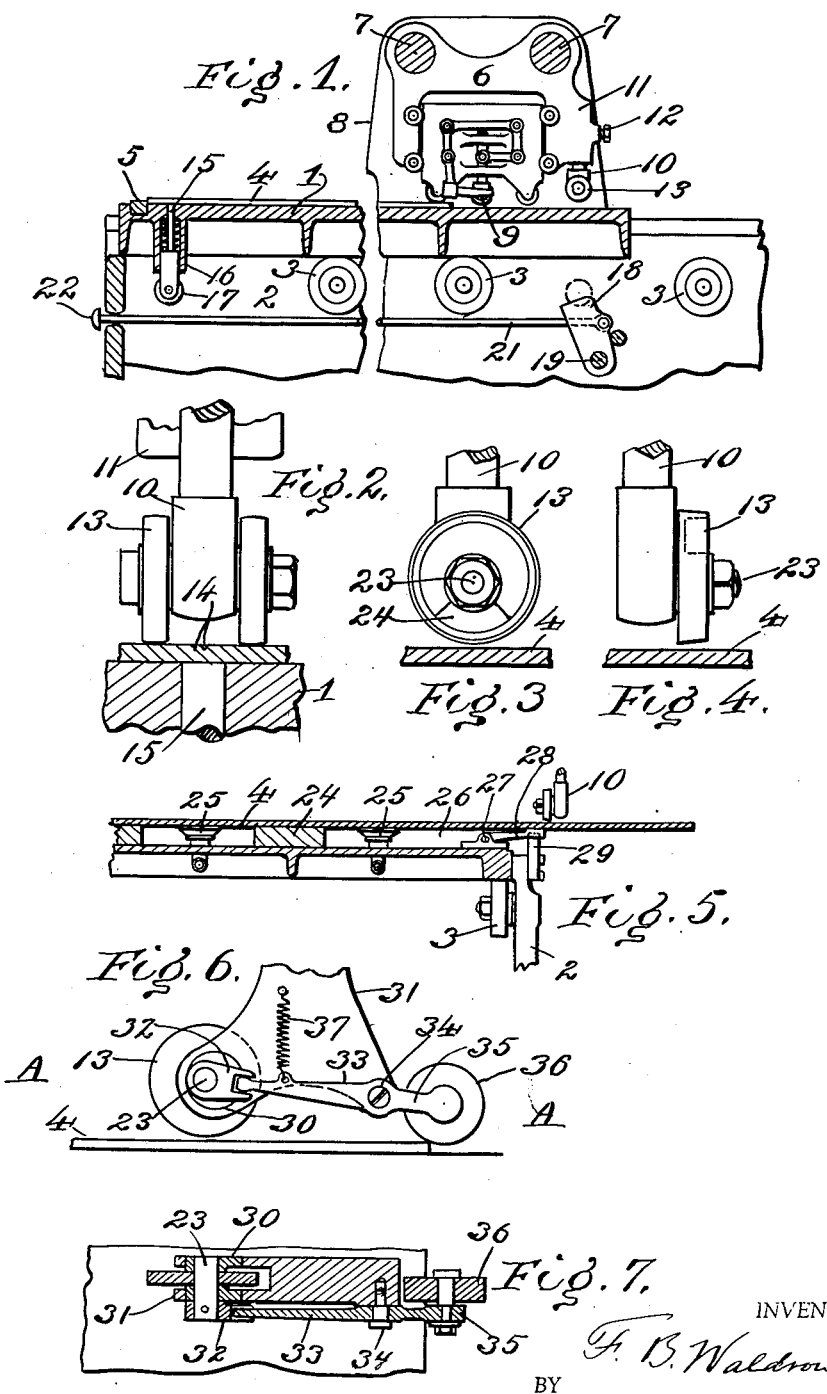

1,972,210

UNITED STATES PATENT OFFICE 1,972,210

APPARATUS FOR SCORING AND SNAPPING FLAT GLASS AUTOMATICALLY

Frederic Barnes Waldron, Prescot, England, assignor to Pilkington Brothers Limited, Liverpool, England, a limited-liability company Application May 13, 1932, Serial No. 611,161
In Great Britain May 15, 1931

12 Claims. (Cl. 49—48)

This invention relates to an apparatus for scoring and snapping flat glass and has for its object a process and apparatus whereby the glass is scored and snapped automatically.

It has been found that glass can be snapped with less risk of the fracture departing from the line of the score, when the bending moment for snapping is applied at the finishing end of the score.

According to the invention glass is scored by movement relatively to a diamond or wheel and then two members, one on each side of the glass co-act to apply a bending moment to the glass along the line of the score at the finishing end thereof to snap the glass.

The invention comprises alternative forms of snapping devices, in which one member is either a pair of wheels straddling the score or a single wheel on one side of the score and glass holding means such as suckers on the other side. It also comprises further alternative forms in which the said one member is a wheel or wheels eccentrically mounted and weighted so that the shortest radius is normally directed towards the glass; a wheel provided with means for varying the height of the wheel by which its height is varied automatically in accordance with the thickness of the glass, or a wheel provided with similar means adapted to be brought into contact with the glass when a roller passes the back edge of the glass.

The invention further comprises alternative forms of the snapping device in which the other member is moved either to apply snapping pressure to the glass or to raise the glass into contact with an eccentrically mounted wheel or wheels, always at a point near the finishing end of the score.

In the accompanying drawing:—

Figure 1 is a longitudinal section, partly broken away, of a reciprocating table apparatus showing cutter and snapping device;

Figure 2 is an end view, on a larger scale, partly in section, of the snapping device;

Figures 3 and 4 are side and end views of an alternative form of the upper member of the snapping device;

Figure 5 is a cross-section of a table with suckers and an alternative form of snapping device;

Figure 6 is a side view of the upper member of an alternative form of snapping device, and Figure 7 is a section along line A—A of Figure 6.

Referring to Figure 1, 1 is a table arranged to reciprocate on the frame 2, and running on rollers 3. The reciprocating gear is not shown. The glass 4 is located by its trailing edge by the straight-edge 5. The frame 6 of the cutting or scoring device is carried on cross-rods 7 supported on a frame 8. The cutting device shown is of the type described in the pending application to R. C. Williamson, Serial No. 556,018, and carries a diamond 9. The cutting device operates to bring the diamond on to the glass slightly behind its front edge. The support 10 of the upper member of the snapping device is held in an extension 11 of the frame 6 and is adjustable for height therein and fixed by a set-screw 12.

The upper member of the snapping device is shown in Figure 2; it carries two wheels 13 which are in contact with or nearly in contact with the glass 4 and straddle the diamond cut 14.

The lower member of the snapping device consists of a plunger 15 normally having its upper end flush with the surface of the table 1 and immediately in front of the straight-edge 5, that is, of the back or trailing edge of the glass 4. The plunger is immediately below the diamond cut 14, as seen in Figure 2. The plunger 15 is guided in a lug 16 of the table and terminates below in a roller 17. A cam 18 is pivoted on a rod 19 fixed to the frame 2 and held against movement to the right from the position shown by a stop rod 20. The cam 18 is so located that its upper surface engages the roller 17 of the plunger 15, when this comes below the wheels 13 of the snapping device; the roller 17 is shown in dotted lines in this position. By engaging the cam 18 the roller 17 forces the plunger 15 upwards, raising the glass, and the plunger 15 then co-operates with the wheels 13 of the upper member of the snapping device to exercise a bending moment on the glass at the diamond cut.

By the above described means, the bending moment is exercised only at a point close to the back edge of the glass, that is, close to the finishing end of the diamond cut.

The cam 18 is connected by a rod 21 to a pull button 22 whereby it can be rocked to the left from the position shown into a position in which it does not engage the roller 17.

A plurality of plungers 15 may be employed, all on the same transverse line, and a cam 18 corresponding to each plunger, with corresponding button 22, may be pivoted on the rod 19. If then the cutter frame 6 be moved across the table to any desired position, the appropriate button 22 may be pushed to place the corresponding cam 18 in position to operate the plunger corresponding to the position of the diamond cut.

Figures 3 and 4 show an alternative form of upper member, in which the wheel 13 is eccentrically mounted on its pivot 23, and the portion of smaller radius is weighted as at 24, so that normally this portion is at the lowest position. The member is mounted so that this portion of small radius is just out of contact with the glass. If then the glass be raised by the operation of the lower member into contact with the wheel 13, this rotates as the glass travels, and, being eccentrically mounted exercises a pressure on the glass.

The form of upper member may have a pair of wheels as in the member shown in Figure 2, or it may be employed with a single wheel in conjunction with a table such as that shown in Figure 5, in which the glass 4 is held to the table by suckers 25 and rests on strips of rubber or the like 26. The form of table shown in Figure 5 is particularly adapted for cutting strips off the edges of glass plates. A lower member 28 is pivoted to the table at 27 close to the back edge of the glass. A projection 29, fixed to the frame 2 has an upper cam surface adapted to engage the pivoted member 28 and raise the glass (which is sufficiently flexible for the small movement required) into contact with the eccentric wheel 13, which then, by its rotation, exercises a bending moment on the glass along the diamond cut, which is above the right hand end of the pivoted member 28. The suckers in this case hold the glass and render a second wheel 13 unnecessary, the suckers and the single wheel constituting the upper member of the snapping device.

The eccentric wheel has an advantage over the concentric wheel when the wheel has to be moved transversely of the table into the desired position, because it is normally out of contact with the glass.

In the alternative form of snapping device shown in Figures 6 and 7, the upper member only moves, the lower member (not shown) being a support such as 28 of Figure 5, but fixed instead of hinged.

The wheel 13 is eccentrically pivoted on a pin 23 which is eccentrically held in and keyed to two discs 30 adapted to turn in a supporting yoke 31. An arm 32 is pinned to the pin 23 and with this engages the arm 33 of a lever pivoted to the yoke 31 at 34; the other arm 35 of the lever carries a roller 36 which is pressed on to the glass by the spring 37. The glass is assumed to be moving to the left as seen in Figure 6 and when the roller 36 passes the back edge, it moves downwards under the action of the spring 37 the arm 33 being thus lifted and the arm 32 together with the pin 23 and the two discs 30 turned counterclockwise. By this movement the pin 23 is lowered, bringing the wheel 13 into contact with the glass. The eccentric wheel 13 then by its rotation presses on the glass to snap it.

The friction between the discs 30 and the yoke 31 is sufficient to prevent rotation of the discs under the pressure between wheel and glass.

The device of Figure 6 also serves to vary the height of the wheel 13 in accordance with the thickness of glass, thus rendering it unnecessary to adjust the height of the support of the wheel 13 for varying thicknesses of glass. Thus, for a glass thicker than that shown, the roller 36 is raised higher, the discs 30 are turned more counterclockwise and the pin 23, with the wheel 13, is moved higher. By suitably proportioning the lengths of the arms 32, 33 and 35 and the eccentricity of the pin 23 in the discs 30, the vertical movement of the wheel 13 may be made equal to that of the roller 36 within the limits found in practice.

The device of Figure 6 may be used solely as a self-adjusting upper member in conjunction with a movable lower member, by disposing the lower member so as to operate before the roller 36 leaves the glass.

The snapping device may be applied to a travelling table of the continuous band type, and then either the lower or the upper member may conveniently be brought into operation by means of an electromagnet the circuit of which is made when the snapping device is close to the finishing end of the score.

The terms "upper member" and "lower member" have been used on the assumption that the glass is horizontal, and their use is not intended to exclude the use of two members one on each side of a vertical plate of glass.

Having described my invention, I declare that what I claim and desire to secure by Letters Patent is:—

1. In apparatus for cutting flat glass automatically in which the glass is scored by movement relative to a scoring member, the combination of a pair of wheels on one side of the glass straddling the score, and a member on the other side of the glass adapted to co-operate with the wheels to apply a bending moment to the glass along the line of the score at a single point near the finishing end thereof, to snap the glass.

2. In apparatus for cutting flat glass automatically in which the glass is scored by movement relative to a scoring member, the combination of a single wheel adapted to act on the glass at one side of the score, suckers adapted to hold down the glass at the other side of the score, and a member adapted to act on the opposite side of the glass to that engaged by the wheel to exert, in conjunction with the wheel and suckers, a bending moment on the glass along the line of the score at the finishing end thereof, to snap the glass.

3. In apparatus for cutting flat glass automatically in which the glass is scored by movement relative to a scoring member, the combination of a pair of wheels on one side of the glass straddling the score, said wheels being eccentrically mounted and weighted so that the shortest radius is normally directed towards the glass, and a member on the other side of the glass adapted to co-operate with the wheels to apply a bending moment to the glass along the line of the score at the finishing end thereof, to snap the glass.

4. In apparatus for cutting flat glass automatically in which the glass is scored by movement relative to a scoring member, the combination of a single wheel adapted to act on the glass at one side of the score, said wheel being eccentrically mounted and weighted so that the shortest radius is normally directed towards the glass, suckers adapted to hold down the glass at the other side of the score, and a member adapted to act on the opposite side of the glass to that engaged by the wheel to exert, in conjunction with the wheel and suckers, a bending moment on the glass along the line of the score at the finishing end thereof, to snap the glass.

5. In apparatus for cutting flat glass automatically in which the glass is scored by movement relative to a scoring member, the combination of a pair of wheels on one side of the glass straddling the score, means operable independently of the pressure between the wheels and the glass for varying the height of the wheels, a roller adapted to rest on the glass and to operate said means for varying the height of the wheels in accordance with the height to which the roller is raised by the glass, and a member on the other side of the glass adapted to co-operate with the wheels to apply a bending moment to the glass along the line of the score at the finishing end thereof, to snap the glass.

6. In apparatus for cutting flat glass automatically in which the glass is scored by movement relative to a scoring member, the combination of a single wheel adapted to act on the glass at one side of the score, means adapted to hold down the glass at the other side of the score, means adapted to vary the height of the wheel, and a member adapted to act on the side of the glass opposite to that engaged by the wheel to exert conjointly with the wheel and the means for holding down the glass a bending moment on the glass along the line of the score at a single point near the finishing end thereof, to snap the glass.

7. In apparatus for cutting flat glass automatically in which the glass is scored by movement relative to a scoring member, an eccentrically mounted wheel adapted to act on the glass at one side of the score, a weight acting on the wheel to maintain the shortest radius normally directed towards the glass, means operable independently of the pressure between the wheel and the glass for varying the height of the wheel, a roller adapted to rest on the glass and to operate said means for varying the height of the wheel in accordance with the height to which the roller is raised by the glass, means adapted to hold down the glass at the other side of the score, and a member adapted to act on the side of the glass opposite to that engaged by the wheel to exert conjointly with the wheel and the means for holding down the glass a bending moment on the glass along the line of the score at the finishing end thereof, to snap the glass.

8. In apparatus for cutting flat glass automatically in which the glass is scored by movement relative to a scoring member, the combination of a pair of wheels on one side of the glass straddling the score, a member at the side of the glass opposite to that engaged by the wheels and means for moving said member when near the finishing end of the score to apply snapping pressure at a single point to the respective side of the glass and facing the score.

9. In appartus for cutting flat glass automatically in which the glass is scored by movement relative to a scoring member, the combination of a single wheel adapted to act on the glass at one side of the score, means adapted to hold down the glass at the other side of the score, a member adapted to act on the side of the glass opposite to that engaged by the wheel and means for moving said member when near the finishing end of the score to apply snapping pressure at a single point to the glass at a point approximately facing the score.

10. In apparatus for cutting flat glass automatically in which the glass is scored by movement relative to a scoring member, the combination of a pair of wheels on one side of the glass straddling the score, said wheels being eccentrically mounted and weighted so that the shortest radius is normally directed towards the glass, a member adapted to act on the side of the glass opposite to that engaged by the wheels and means for moving said member when near the finishing end of the score to raise the glass into contact with the eccentrically mounted wheels.

11. In apparatus for cutting flat glass automatically in which the glass is scored by movement relative to a scoring member, an eccentrically mounted wheel adapted to act on the glass at one side of the score, a weight acting on the wheel to maintain its shortest radius normally directed towards the glass, means operable independently of the pressure between the wheel and the glass for varying the height of the wheel, a roller adapted to rest on the glass and to operate said means for varying the height of the wheel in accordance with the height to which the roller is raised by the glass, means adapted to hold down the glass at the other side of the score, and a member adapted to act on the side of the glass opposite to that engaged by the wheel and means for moving said member when near the finishing end of the score to raise the glass into contact with the eccentrically mounted wheel.

12. In apparatus for cutting flat glass automatically in which the glass is scored by movement relative to a scoring member, the combination of at least one eccentrically mounted wheel adapted to act on the glass adjacent the score, means for lowering the wheel into contact with the glass said means being capable of resisting pressure between the wheel and glass, a roller adapted to operate said means to lower the wheel into contact with the glass when the roller passes the back edge of the glass, and a member at the side of the glass opposite to that engaged by the wheel adapted to co-operate with the wheel to exert a bending moment along the line of the score at the finishing end thereof.

FREDERIC BARNES WALDRON.